United States Patent
Nakamura

(10) Patent No.: US 12,239,036 B2
(45) Date of Patent: Mar. 4, 2025

(54) AUTONOMOUS TRAVEL SYSTEM

(71) Applicant: Yanmar Power Technology Co., Ltd., Osaka (JP)

(72) Inventor: Shoichi Nakamura, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 387 days.

(21) Appl. No.: 17/611,887

(22) PCT Filed: Mar. 25, 2020

(86) PCT No.: PCT/JP2020/013193
§ 371 (c)(1),
(2) Date: Nov. 16, 2021

(87) PCT Pub. No.: WO2020/235209
PCT Pub. Date: Nov. 26, 2020

(65) Prior Publication Data
US 2022/0217893 A1     Jul. 14, 2022

(30) Foreign Application Priority Data

May 17, 2019   (JP) .................................. 2019-093355

(51) Int. Cl.
*A01B 69/04*   (2006.01)
*A01C 11/02*   (2006.01)
*G05D 1/00*    (2024.01)

(52) U.S. Cl.
CPC ............ *A01B 69/008* (2013.01); *A01C 11/02* (2013.01); *G05D 1/0088* (2013.01); *G05D 1/0278* (2013.01)

(58) Field of Classification Search
CPC . A01B 69/008; B65G 43/08; B65G 2201/045
See application file for complete search history.

(56) References Cited

U.S. PATENT DOCUMENTS

2016/0278285 A1   9/2016  Reigo
2018/0074201 A1*  3/2018  Sakai ................... G05D 1/0272

FOREIGN PATENT DOCUMENTS

JP   H09-304079 A   11/1997
JP   2018163507 A   10/2018

* cited by examiner

*Primary Examiner* — Jaime Figueroa
*Assistant Examiner* — Jerrod Irvin Davis
(74) *Attorney, Agent, or Firm* — Chris Mizumoto

(57) ABSTRACT

An autonomous travel system is provided with a location acquisition unit, an inertia measuring device, a travel control unit, an initialization control unit, and a condition setting unit. The location acquisition unit acquires a location of a work vehicle by using a satellite positioning system. The inertia measuring device detects an orientation of the work vehicle. The travel control unit causes the work vehicle to travel autonomously along a preset travel route. The initialization control unit carries out an initialization process for the inertia measuring device by obtaining the orientation of the work vehicle on the basis of a value acquired by the location acquisition unit during initialization travel in which the work vehicle travels straight in a predetermined direction. In the condition setting unit, switching from off to on of a power source of the work vehicle is defined as a first starting condition for the initialization process, and acceptance of an instruction for carrying out the initialization process when the power source of the work vehicle is on is defined as a second starting condition for the initialization process.

4 Claims, 11 Drawing Sheets

FIG. 3
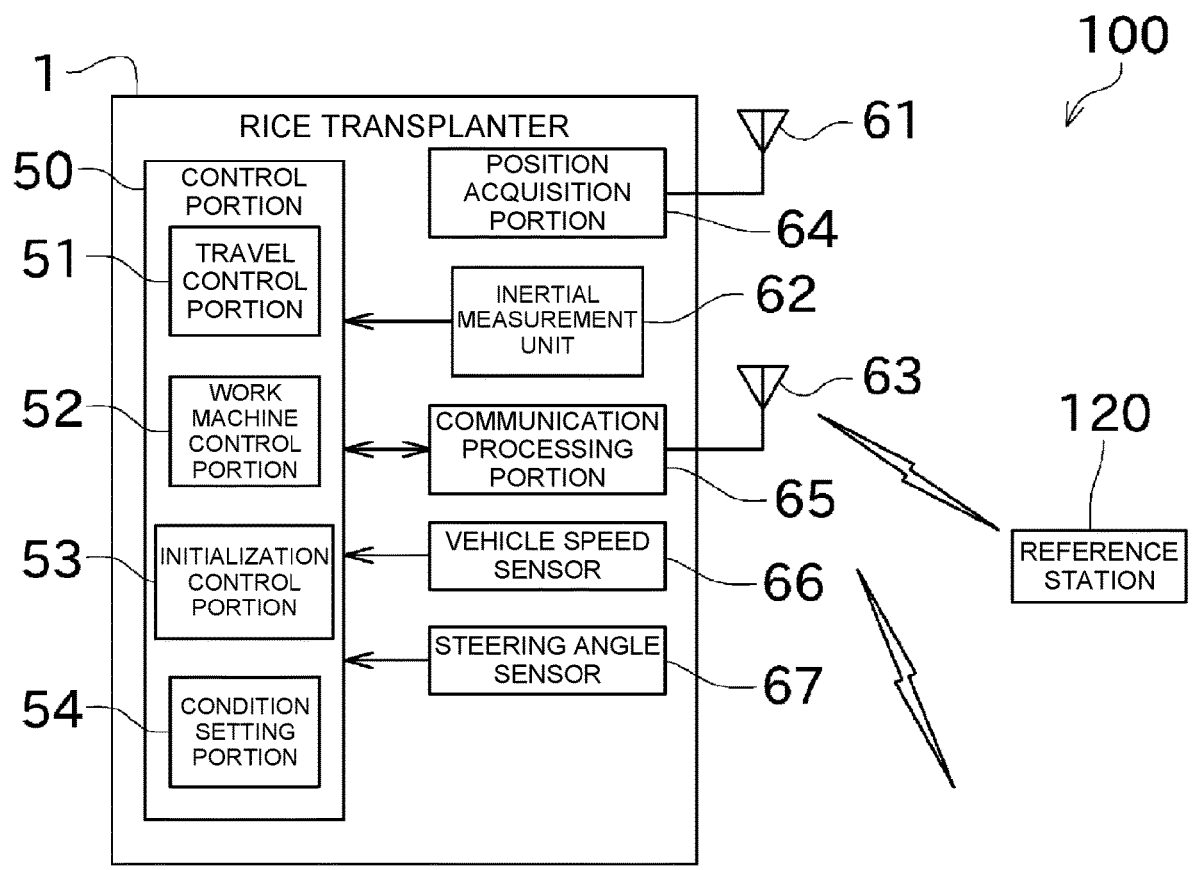
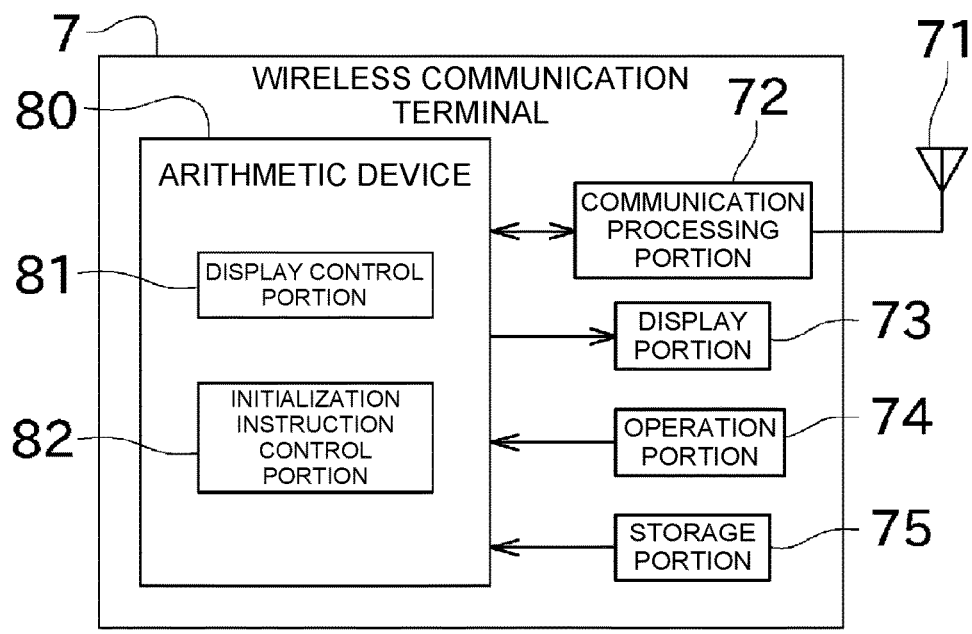

AUTONOMOUS TRAVEL SYSTEM

CROSS-REFERENCE

This application is a US National Stage Application under 35 U.S.C. § 371 of International Application No. PCT/JP2020/013193 filed Mar. 25, 2020, which claims foreign priority of JP2019-093355 filed May 17, 2019 the disclosures of which are hereby incorporated by reference in their entirety.

TECHNICAL FIELD

The present invention mainly relates to an autonomous travel system for causing a work vehicle to travel autonomously.

BACKGROUND ART

Conventionally, autonomous travel systems, which acquire positional information of a work vehicle on the basis of radio waves received from GNSS satellites, and cause the work vehicle to travel autonomously along a route set in advance, are known. In order to realize such autonomous traveling, it is necessary that the orientation of the work vehicle be ascertained by an autonomous travel control portion, which causes the work vehicle to travel autonomously.

In Patent Literature 1, by use of the feature that a work vehicle has a structure which enables radio waves to be received from GNSS satellites, a user is made to manually drive the work vehicle to move it forward or backward, and a change in the position of the work vehicle then is detected on the basis of the radio waves from the GNSS satellites. Further, the direction in which the position of the work vehicle has changed or the opposite direction thereof is assumed as the orientation of the work vehicle, and the orientation (direction) of the work vehicle is thereby detected. In the following, the above processing will be referred to as initialization processing.

CITATION LIST

Patent Literature

Patent Literature 1: JP 2018-163507 A

DISCLOSURE OF INVENTION

Problems to be Solved by the Invention

Patent Literature 1 describes that the initialization processing is performed when a predetermined condition is satisfied at the time when the work vehicle (a tractor) is started. However, Patent Literature 1 does not describe that the initialization processing is performed at a timing other than the above.

The present invention has been conceived in consideration of the above circumstances, and the main object of the present invention is to provide an autonomous travel system for which the initialization processing can be performed easily.

Means for Solving the Problems

Effect of the Invention

The problem to be solved by the present invention is as described above, and the means for solving the above-described problem and the effects thereof will be described in the following.

According to an aspect of the present invention, an autonomous travel system having the following configuration is provided. That is, the autonomous travel system is provided with a position acquisition portion, an orientation detection portion, a travel control portion, an initialization control portion, and a condition setting portion. The position acquisition portion acquires a position of a work vehicle by using a satellite positioning system. The orientation detection portion detects an orientation of the work vehicle. The travel control portion causes the work vehicle to travel autonomously along a travel route set in advance. The initialization control portion performs initialization processing for the orientation detection portion by obtaining the orientation of the work vehicle on the basis of an acquisition value of the position acquisition portion that is acquired during execution of initialization traveling in which the work vehicle travels straight in a predetermined direction. In the condition setting portion, it is set, as a first starting condition for the initialization processing, that a power source of the work vehicle is switched from OFF to ON, and it is set, as a second starting condition for the initialization processing, that an instruction to perform the initialization processing is received when the power source of the work vehicle is ON.

By the above feature, it is possible to have the initialization processing performed not only when the power source of the work vehicle is turned on from off, but also when the power source of the work vehicle is maintained to be ON, by an instruction given separately. Accordingly, since it becomes possible to perform the initialization processing without performing the processing of setting the power source of the work vehicle to OFF, the initialization processing for the orientation detection portion can be performed easily.

In the autonomous travel system described above, preferably, the travel control portion should cause the work vehicle to perform the initialization traveling autonomously in a case where the initialization processing has not been completed, the first starting condition or the second starting condition is satisfied, and travel permission conditions are satisfied.

By the above feature, the work vehicle can be made to travel autonomously to perform the initialization processing. Consequently, as compared to a case where an operator causes the work vehicle to travel manually, the time and effort of the operator can be reduced.

In the autonomous travel system described above, the following configurations should preferably be employed. That is, the travel control portion stops the autonomous traveling along the travel route in a case where the position acquisition portion becomes unable to acquire the position of the work vehicle with predetermined accuracy. The initialization control portion resets an initialization completed state when the position acquisition portion becomes unable to acquire the position of the work vehicle with predetermined accuracy. The travel control portion causes the work vehicle to perform the initialization traveling autonomously in a case where the position acquisition portion is enabled to acquire the position of the work vehicle with predetermined accuracy, the first starting condition or the second starting condition is satisfied, and the travel permission conditions are satisfied.

By the above feature, even if satellite positioning or the like is unsuccessful, the work vehicle can be made to travel autonomously to perform the initialization processing. Therefore, the time and effort of the operator can be reduced.

In the autonomous travel system described above, the travel control portion sets, as a resuming position, a position where the autonomous traveling is stopped as a result of the position acquisition portion being unable to acquire the position of the work vehicle with predetermined accuracy, and causes the work vehicle to travel autonomously to the resuming position after completion of the initialization processing.

By the above feature, even after occurrence of a change in the position by the initialization traveling, work can be resumed from the resuming position before the initialization traveling is performed.

In the autonomous travel system described above, an instruction to perform the initialization processing should preferably be transmitted from a wireless communication terminal that is provided separately from the work vehicle.

By this feature, the initialization processing can be executed remotely.

BRIEF DESCRIPTION OF DRAWINGS

FIG. 3 is a block diagram illustrating a main configuration of the autonomous travel system.

DESCRIPTION OF EMBODIMENTS

Figure 1:
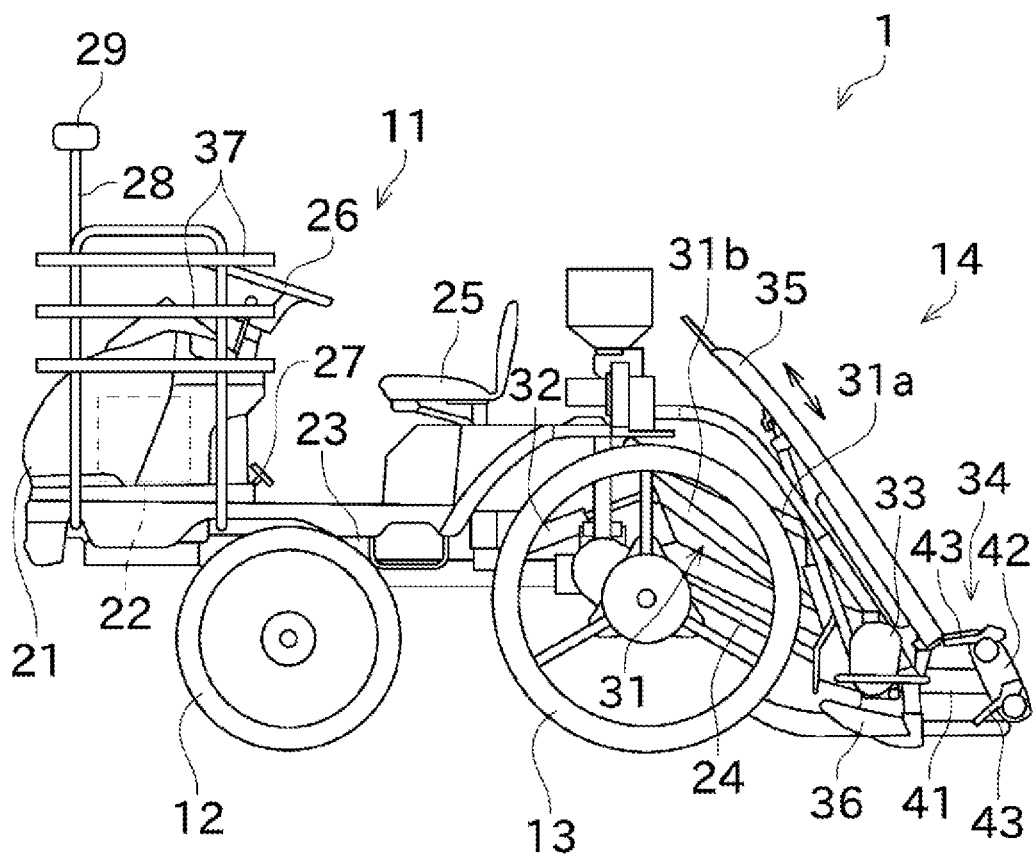
FIG. 1 is a side view illustrating an overall configuration of a rice transplanter used in an autonomous travel system according to an embodiment of the present invention.
Figure 2:
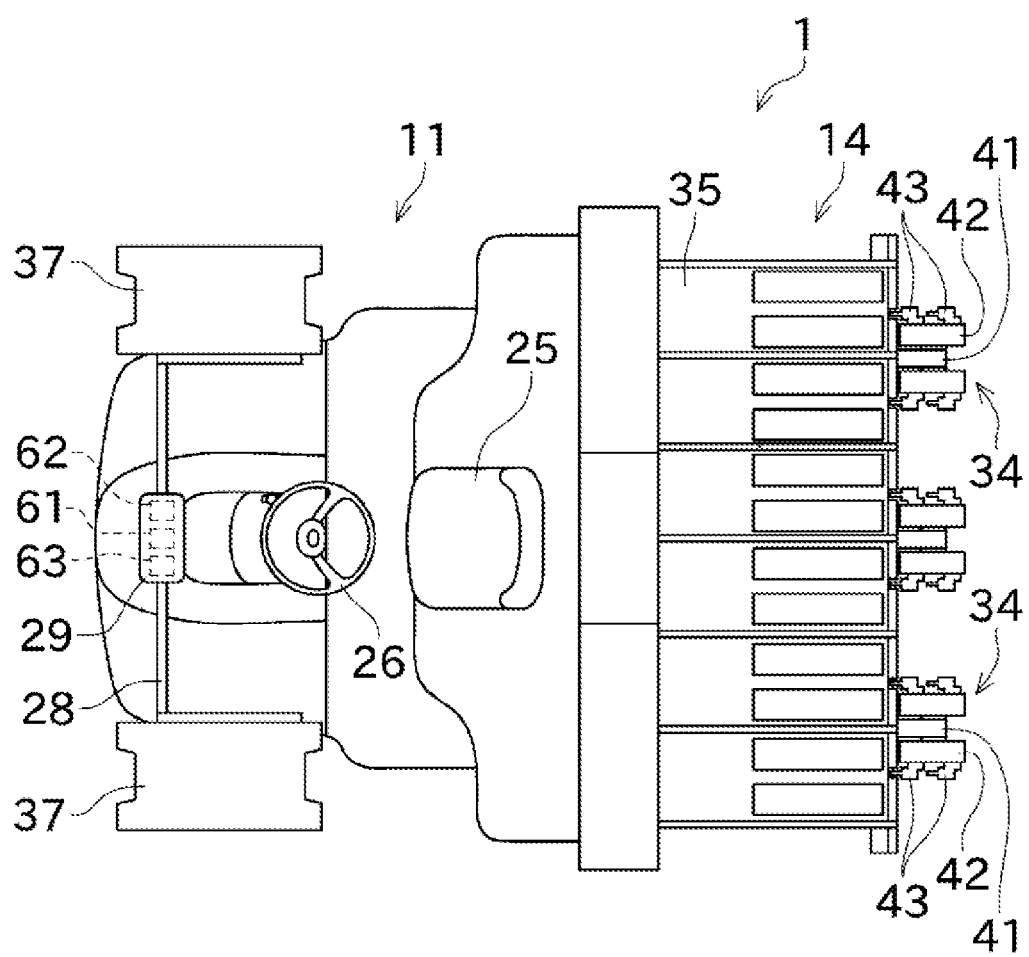
FIG. 2 is a plan view of the rice transplanter.

Next, an embodiment of the present invention will be described with reference to the drawings. FIG. 1 is a side view of a rice transplanter 1 used in an autonomous travel system 100 according to an embodiment of the present invention. FIG. 2 is a plan view of the rice transplanter 1. FIG. 3 is a block diagram of the rice transplanter 1 and a wireless communication terminal 7.

The autonomous travel system 100 of the present embodiment is a system for causing the rice transplanter 1, which performs rice planting (planting of seedlings) in a farm field, to perform autonomous traveling. The autonomous traveling means that a device related to traveling is controlled by a control device provided in the rice transplanter 1, and thus at least steering is performed autonomously to make the rice transplanter 1 travel along a predetermined path. Further, a configuration whereby a vehicle speed or work by a work machine, for example, in addition to the steering, is performed autonomously may be employed. The autonomous traveling includes a case in which a person is on board the rice transplanter 1, and a case in which no person is on board the rice transplanter 1. Note that the work vehicle in the present invention is not limited to the rice transplanter 1, but may be, for example, a seeder, a tractor, a combine harvester, or the like.

As shown in FIGS. 1 and 2, the rice transplanter 1 includes a vehicle body part 11, front wheels 12, rear wheels 13, and a planting part 14. The front wheels 12 and the rear wheels 13 are provided in pairs on the left and right sides of the vehicle body part 11, respectively.

The vehicle body part 11 is provided with a hood 21. The hood 21 is provided at a front part of the vehicle body part 11. An engine 22 is provided inside the hood 21.

Power generated by the engine 22 is transmitted to the front wheels 12 and the rear wheels 13 via a transmission case 23. The power is also transmitted to the planting part 14 via the transmission case 23, and a PTO shaft 24 disposed at a rear part of the vehicle body part 11.

The vehicle body part 11 further includes a driver's seat 25 for an operator to sit down, and a plurality of operation tools. The driver's seat 25 is disposed between the front wheels 12 and the rear wheels 13 in a front-rear direction of the vehicle body part 11. The plurality of operation tools correspond to, for example, a steering wheel 26, and a speed changing operation pedal 27.

A traveling direction of the rice transplanter 1 is changed as the operator operates the steering wheel 26. A traveling speed (vehicle speed) of the rice transplanter 1 is adjusted as the operator operates the speed changing operation pedal 27.

The planting part 14 is disposed behind the vehicle body part 11. The planting part 14 is coupled to the vehicle body part 11 via an elevating/lowering link mechanism 31. The elevating/lowering link mechanism 31 is composed of parallel links including a top link 31a and a lower link 31b.

An elevating/lowering cylinder 32 is coupled to the lower link 31b. As the elevating/lowering cylinder 32 is expanded and contracted, the planting part 14 is elevated or lowered up or down relative to the vehicle body part 11. While the elevating/lowering cylinder 32 is a hydraulic cylinder in the present embodiment, an electric cylinder may be applied alternatively.

The planting part 14 is provided with a planting input case portion 33, a plurality of planting units 34, a seedling placement table 35, a plurality of floats 36, and a preliminary seedling table 37. The planting part 14 can sequentially supply seedlings to the respective planting units 34 from the seedling placement table 35, and continuously plant the seedlings.

Each planting unit 34 includes a planting transmission case portion 41, and a rotary case portion 42. Power is transmitted to the planting transmission case portion 41 via the PTO shaft 24 and the planting input case portion 33.

The rotary case portion 42 is rotatably mounted to the planting transmission case portion 41. The rotary case portion 42 is disposed on both sides of the planting transmission case portion 41 in a vehicle width direction. Two planting claws 43 are mounted on one side of each rotary case portion 42.

The two planting claws 43 are aligned in the traveling direction of the rice transplanter 1. The two planting claws 43 are displaced in accordance with rotation of the rotary case portion 42. By the displacement of the two planting claws 43, planting of the seedlings for one row is carried out.

The seedling placement table 35 is arranged at a front upper side of the plurality of planting units 34. On the seedling placement table 35, seedling mats can be placed. The seedling placement table 35 is configured in such a way that it can feed the seedlings of the seedling mat placed on the seedling placement table 35 to each of the planting units 34.

Specifically, the seedling placement table 35 is configured to be movable for transverse feed (i.e., slidable in a transverse direction) so as to reciprocate in the vehicle width direction. Also, the seedling placement table 35 is configured in such a way that the seedling mats can be intermittently conveyed downward for longitudinal feed at reciprocating movement ends of the seedling placement table 35.

The floats 36 are each provided to be swingable at a lower portion of the planting part 14. A lower surface of each float 36 can be brought into contact with a surface of the farm field in order to stabilize the planting posture of the planting part 14 with respect to the surface of the farm field.

The preliminary seedling table 37 is provided on each of the left and right sides of the vehicle body part 11, forming a pair. The preliminary seedling tables 37 are disposed on the outer side of the hood 21 in the vehicle width direction. On the preliminary seedling tables 37, a seedling box accommodating preliminary mat seedlings can be mounted.

Upper portions of a pair of the left and right preliminary seedling tables 37 are coupled to each other by a coupling frame 28 extending in an up-down direction and the vehicle width direction. At the center of the coupling frame 28 in the vehicle width direction, a housing 29 is provided. Inside the housing 29, a positioning antenna 61, an inertial measurement unit (IMU) 62, and a communication antenna 63 are provided.

The positioning antenna 61 can receive radio waves from positioning satellites which constitute a satellite positioning system (GNSS). As a well-known positioning calculation is performed on the basis of the radio wave, a position of the rice transplanter 1 can be acquired.

The inertial measurement unit 62 includes three gyroscope sensors (angular velocity sensors), and three acceleration sensors. The details of information detected by the inertial measurement unit 62, and initialization processing for the inertial measurement unit 62 will be described later.

The communication antenna 63 is an antenna for performing wireless communication with the wireless communication terminal 7 illustrated in FIG. 3.

A control portion 50 includes an arithmetic device, a storage device, and an input-output portion, etc., which are not illustrated. In the storage device, various programs and data, etc., are stored. The arithmetic device can read the various programs from the storage device and execute those programs. By cooperation between the hardware and software as described above, the control portion 50 can be made to operate as a travel control portion 51, a work machine control portion 52, an initialization control portion 53, and a condition setting portion 54. The control portion 50 may be a single piece of hardware or multiple pieces of hardware that can communicate with each other. Further, in addition to the inertial measurement unit 62 mentioned above, a position acquisition portion 64, a communication processing portion 65, a vehicle speed sensor 66, and a steering angle sensor 67 are connected to the control portion 50.

The position acquisition portion 64 acquires positioning information regarding the rice transplanter 1 as a mobile station, on the basis of the radio waves that the positioning antenna 61 has received from the positioning satellites. More specifically, the position acquisition portion 64 acquires, for each positioning satellite from which the radio wave has been received, a pseudo distance from the positioning satellite to the positioning antenna 61, and a carrier phase obtained when the radio wave reached the positioning antenna 61. The pseudo distance is obtained by multiplying a signal propagation time, which has been measured by using an internal clock of the positioning satellite, and an internal clock of the position acquisition portion 64, by the speed of light. Further, the carrier phase is obtained by measuring a difference between the phase of a carrier wave received by the positioning antenna 61 and the phase output by an internal oscillator of the position acquisition portion 64.

In addition, with respect to a reference station 120 whose position is known, the position acquisition portion 64 acquires positioning correction information generated on the basis of a pseudo distance from the positioning satellite to the reference station 120, and a carrier phase obtained when a radio wave reached the reference station 120. In the present embodiment, as the reference station 120 and the rice transplanter 1 conduct direct communication, the position acquisition portion 64 acquires the positioning correction information. Alternatively, the position acquisition portion 64 may acquire the positioning correction information via the Internet and the wireless communication terminal 7, etc.

The position acquisition portion 64 performs calculation based on a well-known GNSS-RTK method by using positioning information, which is an observed value obtained at the rice transplanter 1, and the positioning correction information generated by the reference station 120. By doing so, the position acquisition portion 64 continuously calculates a baseline solution between the rice transplanter 1, which corresponds to the mobile station, and the reference station 120. In this way, a positioning solution, which is the position of the rice transplanter 1, can be obtained in real time. In the GNSS-RTK method, the carrier phase of the radio waves from the GNSS satellites is detected at both the rice transplanter 1 and the reference station 120 to be used for the positioning calculation. Thus, the position of the rice transplanter 1 can be acquired with significantly high accuracy as compared to a case of ordinary single point positioning. Alternatively, instead of the GNSS-RTK method, positioning operation using, for example, a differential GNSS, may be performed.

The communication processing portion 65 is electrically connected to the communication antenna 63. The communication processing portion 65 can perform modulation processing or demodulation processing by an appropriate method, and perform transmission and reception of data to and from the wireless communication terminal 7.

The vehicle speed sensor 66 detects the vehicle speed of the rice transplanter 1. The vehicle speed sensor 66 is provided at an appropriate position of the rice transplanter 1, such as at an axle of the front wheels 12. In the case as described above, the vehicle speed sensor 66 generates a pulse according to the rotation of the axle of the front wheels 12. Data regarding detection results obtained by the vehicle speed sensor 66 are output to the control portion 50.

The steering angle sensor 67 detects the steering angle of the front wheels 12. The steering angle sensor 67 is provided at an appropriate position of the rice transplanter 1, such as at a kingpin not illustrated that is provided on the front wheel 12. Note that the steering angle sensor 67 may be provided on the steering wheel 26. Data regarding detection results obtained by the steering angle sensor 67 are output to the control portion 50.

The travel control portion 51 performs automatic control related to traveling of the rice transplanter 1. For example, the travel control portion 51 can perform vehicle speed control and steering control. The travel control portion 51 may perform both the vehicle speed control and the steering control at the same time, or may be configured to perform only the steering control. In the case of the latter, the vehicle speed of the rice transplanter 1 is operated by an operator by using the speed changing operation pedal 27.

In the vehicle speed control, the vehicle speed of the rice transplanter 1 is adjusted on the basis of a predetermined condition. Specifically, the vehicle speed control is one that the travel control portion 51 performs control so that the current vehicle speed obtained from a result of detection by the vehicle speed sensor 66 is approximated to a target vehicle speed. Such control is realized by changing at least one of a gear ratio of a transmission in the transmission case 23 and a rotational speed of the engine 22. Note that the vehicle speed control includes control to bring the vehicle speed to zero so that the rice transplanter 1 is stopped.

The steering control is control for adjusting the steering angle of the rice transplanter 1 on the basis of a predetermined condition. Specifically, the steering control is one that the travel control portion 51 performs control so that the current steering angle obtained from a result of detection by the steering angle sensor 67 is approximated to a target steering angle. Such control is realized, for example, by driving a steering actuator provided on a rotating shaft of the steering wheel 26. With respect to the steering control, the travel control portion 51 may directly adjust a steerage angle (a wheel) of the front wheel 12 of the rice transplanter 1, instead of adjusting a rotation angle (a steering angle) of the steering wheel 26.

The work machine control portion 52 can control the operation (an elevating/lowering operation or planting work, etc.) of the planting part 14 on the basis of a predetermined condition. Processing to be performed by the initialization control portion 53 and the condition setting portion 54 will be described later.

The wireless communication terminal 7 is a tablet terminal, and is provided with a communication antenna 71, a communication processing portion 72, a display portion 73, an operation portion 74, a storage portion 75, and an arithmetic portion 80. Note that the wireless communication terminal 7 is not limited to the tablet terminal, but may be a smartphone or a notebook computer. While the wireless communication terminal 7 performs various kinds of processing related to autonomous traveling of the rice transplanter 1, at least a part of such processing may be performed by the control portion 50 of the rice transplanter 1. Conversely, at least a part of various kinds of processing related to autonomous traveling that the control portion 50 of the rice transplanter 1 performs may be performed by the wireless communication terminal 7.

The communication antenna 71 is a short-range communication antenna for performing wireless communication with the rice transplanter 1. The communication processing portion 72 is electrically connected to the communication antenna 71. The communication processing portion 72 performs, for example, modulation processing of a transmission signal or demodulation processing of a received signal. Also, either one of the rice transplanter 1 and the wireless communication terminal 7 is provided with a portable communication antenna for performing communication using a portable telephone line and the Internet. By the above feature, it is possible to have, for example, a part of the information stored in the rice transplanter 1 or the wireless communication terminal 7 stored on an external server, or information can be acquired from the external server.

The display portion 73 is a liquid crystal display or an organic EL display, and is configured in such a way that an image can be displayed. The display portion 73 can display, for example, information on the autonomous traveling, information on the settings of the rice transplanter 1, results of detection by various sensors, and warning information, etc.

The operation portion 74 includes a touch panel, and a hardware key. The touch panel is arranged to overlap the display portion 73, and can detect an operation by an operator's finger or the like. The hardware key is arranged on a side surface of a housing of the wireless communication terminal 7 or at a periphery or the like of the display portion 73, and can be operated by being pressed by an operator. It should be noted that the wireless communication terminal 7 may be configured to include only one of the touch panel and the hardware key.

The storage portion 75 is a non-volatile memory such as a flash memory or a hard disk. In the storage portion 75, information on autonomous traveling, for example, is stored.

The arithmetic portion 80 is an arithmetic device such as a CPU. The arithmetic portion 80 can read various programs from the storage portion 75 and execute those programs. By cooperation between the hardware and software as described above, the arithmetic portion 80 can be made to operate as a display control portion 81 and an initialization instruction control portion 82. Processing to be performed by the display control portion 81 and the initialization instruction control portion 82 will be described later.

Figure 4:
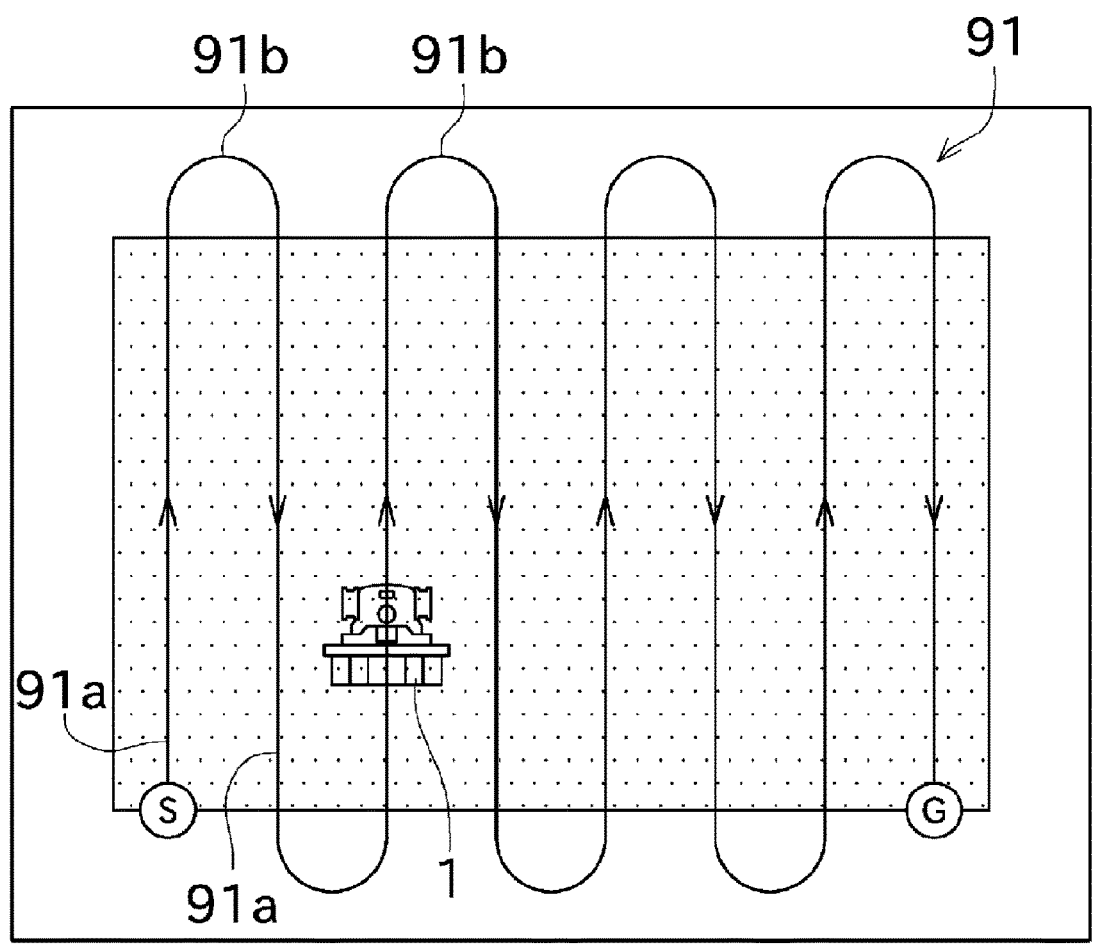
FIG. 4 is a diagram illustrating a travel route created in a farm field.

Next, referring to FIG. 4, a farm field and a travel route for autonomous traveling will be described. The farm field includes a work area and a headland area. The work area is located at a central part of the farm field, and is an area for performing work. The headland area is located outside the work area, and is an area to be used for appropriately performing the work in the work area. For example, the headland area is used for allowing the rice transplanter 1 which has entered the farm field to move to a start position of the work in the work area. Further, the headland area is also used as an area for allowing the rice transplanter 1 to turn.

The position and the shape of the farm field are created on the basis of transition of positional information to be obtained when the rice transplanter 1 is made to travel along an outer periphery of the farm field. Alternatively, the position and the shape of the farm field may be created by range designation by a user on a map displayed on the display portion 73, for example, without making the rice transplanter 1 actually travel. In addition, while information on the farm field is stored in the wireless communication terminal 7 in the present embodiment, the information may be stored in the above-described server. In this case, the wireless communication terminal 7 acquires the information on the farm field from this server.

In the present embodiment, a travel route 91 for enabling the rice transplanter 1 to travel autonomously is created. The travel route 91 is created by, for example, the arithmetic portion 80. As illustrated in FIG. 4, the travel route 91 is constituted by including a plurality of linear routes 91a and a plurality of turning routes 91b. Also, a start position (S in FIG. 4) and an end position (G in FIG. 4) are set in the travel route 91. Note that the travel route 91 shown in FIG. 4 is an example, and the rice transplanter 1 can be made to travel autonomously along a route having a different feature.

Next, the inertial measurement unit 62 will be described in further detail.

The inertial measurement unit 62 is a sensor unit capable of specifying the posture, acceleration, etc., of the rice transplanter 1. Specifically, the inertial measurement unit 62 is provided with a sensor group in which an angular velocity sensor and an acceleration sensor are mounted on each of a first axis, a second axis, and a third axis that are orthogonal to each other.

More specifically, the inertial measurement unit 62 is one that is provided with a first acceleration sensor which detects acceleration in a first axis direction, a second acceleration sensor which detects acceleration in a second axis direction, a third acceleration sensor which detects acceleration in a third axis direction, a first angular velocity sensor which detects an angular velocity about the first axis, a second angular velocity sensor which detects an angular velocity about the second axis, and a third angular velocity sensor which detects an angular velocity about the third axis.

The orientation of the inertial measurement unit 62 with respect to the rice transplanter 1 is set such that the first angular velocity sensor can detect a roll angular velocity of the rice transplanter 1, the second angular velocity sensor can detect a pitch angular velocity of the rice transplanter 1, and the third angular velocity sensor can detect a yaw angular velocity of the rice transplanter 1, and the inertial measurement unit 62 is mounted at a position of the center of gravity of the rice transplanter 1. In other words, the first axis is arranged to agree with a front-rear direction of the rice transplanter 1, that is, to correspond to a roll rotation axis. The second axis is arranged to agree with a left-right direction of the rice transplanter 1, that is, to correspond to a pitch rotation axis. The third axis is arranged to agree with an up-down direction of the rice transplanter 1, that is, to correspond to a yaw rotation axis.

By a result of detection by the inertial measurement unit 62 having such a configuration, the angular velocity of a posture change of the rice transplanter 1 (i.e., the roll angular velocity, the pitch angular velocity, and the yaw angular velocity), and the acceleration in the front-rear direction, the left-right direction, and the up-down direction can be specified. Further, a result of integration of the obtained angular velocities is used to acquire the posture of the rice transplanter 1. Information on the posture of the rice transplanter 1 is input to the control portion 50, and is used to correct the positional information which has been acquired by the position acquisition portion 64, or is used for the other control.

Also, a well-known inertial navigation operation is performed by using information on the posture change and acceleration of the rice transplanter 1, which have been acquired by the inertial measurement unit 62. By doing so, in a case where it becomes impossible to calculate the positional information due to a temporary interruption of radio waves from the GNSS satellites, for example, the position of the rice transplanter 1 during the interrupted time can be obtained.

In order to allow the rice transplanter 1 having such a configuration to travel autonomously appropriately, it is not sufficient that the positional information of the rice transplanter 1 is accurately ascertained by the control portion 50, but it is also necessary that the orientation of the rice transplanter 1 be accurately ascertained by the control portion 50. In this respect, while the angular velocity sensors of the inertial measurement unit 62 can detect a change in the orientation of the rice transplanter 1, the angular velocity sensors of the inertial measurement unit 62 cannot detect the orientation of the rice transplanter 1 itself. In particular, the angle (yaw angle) indicating the direction in which the rice transplanter 1 faces cannot be obtained even by using gravitational acceleration as a key.

Therefore, in the present embodiment, the rice transplanter 1 is actually made to travel straight in a predetermined direction (for example, forward or backward), and a position change of the rice transplanter 1 at this time is obtained by using the GNSS radio waves. In this way, a yaw angle is obtained on the basis of an orientation indicated by the obtained position change. The processing of obtaining the direction (yaw angle) in which the rice transplanter 1 faces in the above-described manner is referred to as initialization processing, and causing the rice transplanter 1 to travel straight for performing the initialization processing is referred to as initialization traveling. Also, a vehicle speed and a travel distance for performing the initialization traveling are determined in advance. The above-described initialization control portion 53 performs control related to the initialization processing. The condition setting portion 54 sets conditions for starting the initialization processing.

Further, as long as an orientation detection portion is capable of detecting at least the orientation of the rice transplanter 1 (more specifically, the orientation with the up-down direction being the center of rotation), the orientation detection portion may be configured differently from the inertial measurement unit 62 of the present embodiment.

Patent Literature 1 describes that initialization processing is performed only at the time when a tractor is started. Also, Patent Literature 1 describes that an operator manually performs the initialization traveling. Therefore, in order to perform the initialization processing in the configuration of Patent Literature 1, the operator must first get on the tractor and set a power source from OFF to ON before the operator operates the tractor for performing the initialization traveling. In this respect, in the present embodiment, an operator can give an instruction for the initialization processing remotely without coming close to the rice transplanter 1, while a state in which a power source of the rice transplanter 1 is turned on is being maintained, and it is also possible to perform the initialization traveling autonomously instead of manually. In the following, the specifics will be described.

Figure 5:
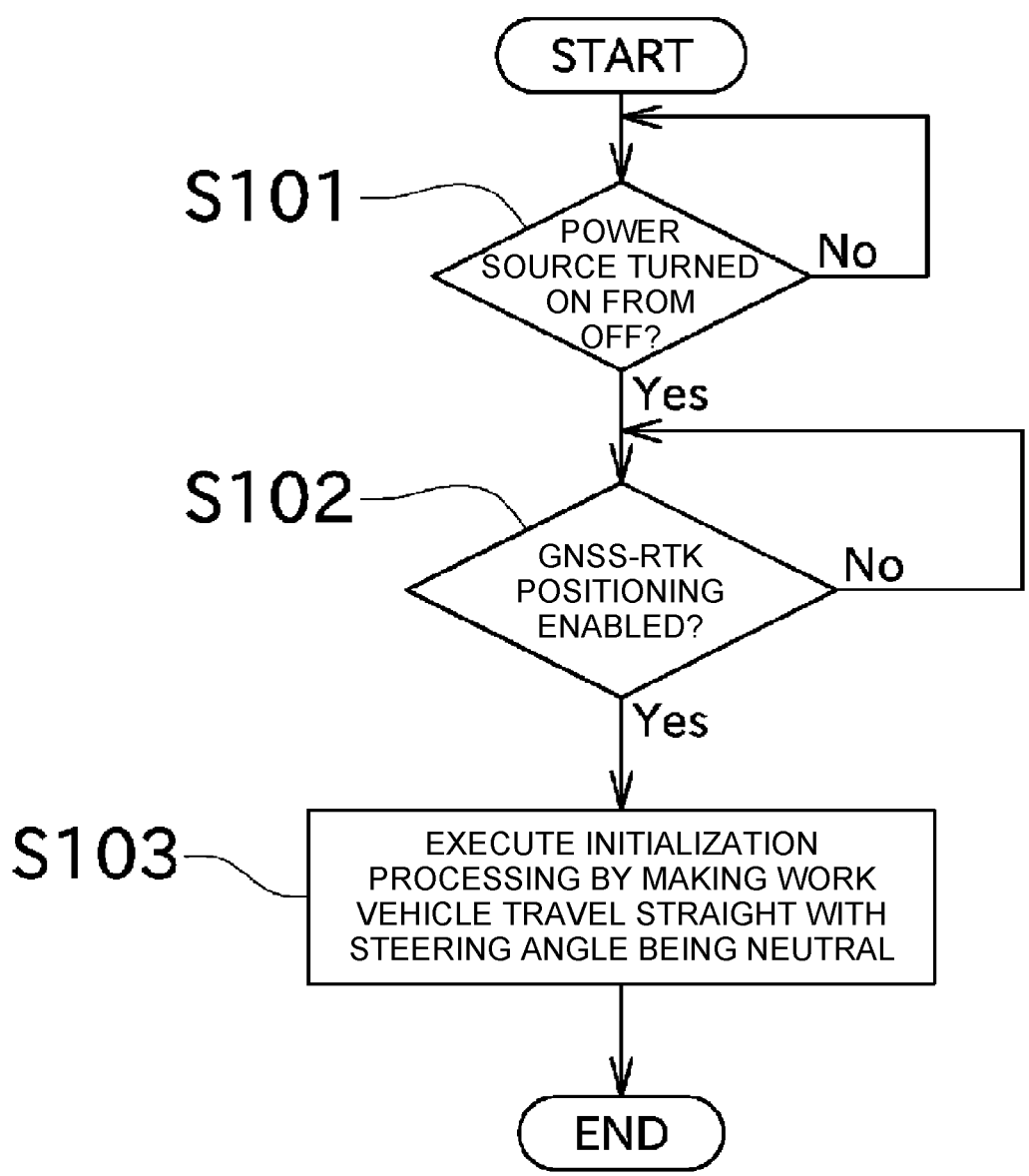
FIG. 5 is a flowchart illustrating processing for executing initialization processing after a power source of the rice transplanter has been turned on from off.

First, referring to FIG. 5, a flow of performing the initialization processing for the inertial measurement unit 62 at the time when the rice transplanter 1 is started will be described.

In the autonomous travel system 100 of the present embodiment, as in Patent Literature 1, the initialization processing is performed also at the time when the rice transplanter 1 is started. The time when the rice transplanter 1 is started means the time when the power source of the rice transplanter 1 is switched from OFF to ON (strictly speaking, until a predetermined time elapses after the power source has been switched to ON).

The initialization control portion 53 determines whether the power source of the rice transplanter 1 has been switched from OFF to ON (i.e., whether the time is immediately after the rice transplanter 1 has been started). When the initialization control portion 53 determines that the power source of the rice transplanter 1 has been switched from OFF to ON, the initialization control portion 53 determines whether GNSS-RTK positioning is enabled or not (S102). The GNSS-RTK positioning being enabled means that both the positioning information of the rice transplanter 1 as the mobile station and the positioning correction information generated by the reference station 120 are appropriately received, and calculation by the GNSS-RTK method is being enabled. Therefore, when the GNSS-RTK positioning is enabled, the position of the rice transplanter 1 can be acquired with high accuracy (predetermined accuracy). Meanwhile, when either one of the positioning information and positioning correction information of the rice transplanter 1 cannot be acquired due to an obstacle or the like, GNSS-RTK is not enabled and thus the position of the rice transplanter 1 cannot be acquired with high accuracy. It is possible that the position of the rice transplanter 1 may be obtained with low accuracy (less than or equal to predetermined accuracy) by single point positioning.

When the GNSS-RTK positioning is not enabled, the initialization processing cannot be performed appropriately. Accordingly, when the initialization control portion 53 determines that the GNSS-RTK positioning is enabled, the initialization processing is performed (S103). Specifically, the initialization control portion 53 gives an instruction to the travel control portion 51, and the travel control portion 51 performs the initialization traveling by setting the above-described steering angle to neutral, and making the rice transplanter 1 travel straight (move forward or backward). As described above, in the initialization traveling, while the travel control portion 51 can cause the rice transplanter 1 to travel autonomously, an operator may cause the rice transplanter 1 to travel manually. In addition, the initialization control portion 53 performs the initialization processing for the inertial measurement unit 62 as described above during execution of initialization traveling. Values calculated in the initialization processing are stored in the control portion 50, etc., and are used for calculation of the position and the orientation of the rice transplanter 1.

As seen from the above, the condition setting portion 54 sets that the power source is turned on from off as a first starting condition for the initialization processing. Further, in the present embodiment, as another condition for starting the initialization processing, the GNSS-RTK positioning being enabled is also set. The rice transplanter 1 may store the values calculated in the initialization processing for a certain period of time even after the power source has been turned off. In this case, when it is obvious that the orientation of the rice transplanter 1 remains to be unchanged during a period in which the power source of the rice transplanter 1 is OFF (for example, when the rice transplanter 1 is restarted), the values calculated in the initialization processing that has been conducted previously may be used even when the power source of the rice transplanter 1 is turned on from off.

Figure 6:
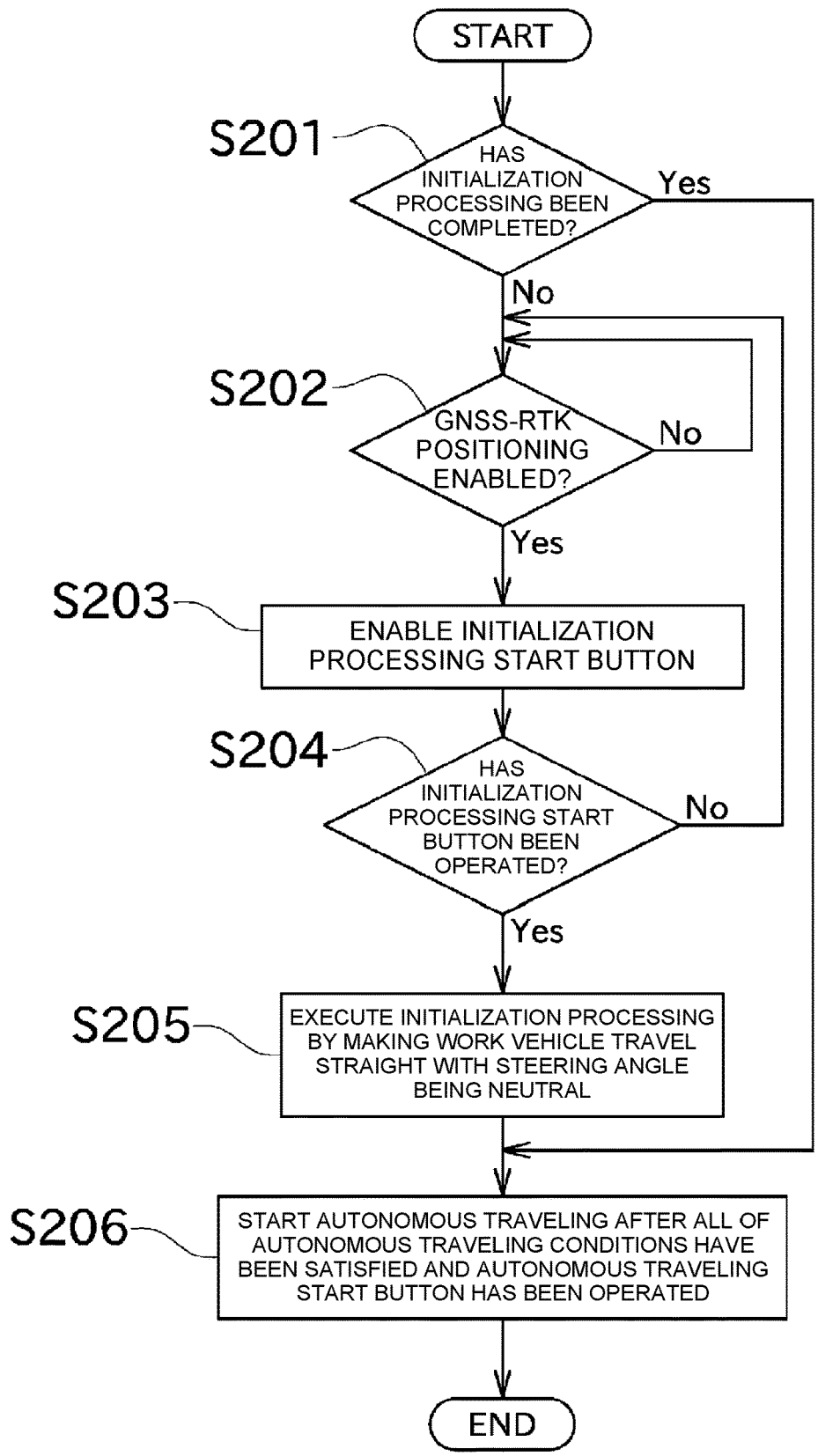
FIG. 6 is a flowchart illustrating processing for executing initialization processing during a preparation of autonomous traveling.
Figure 7:
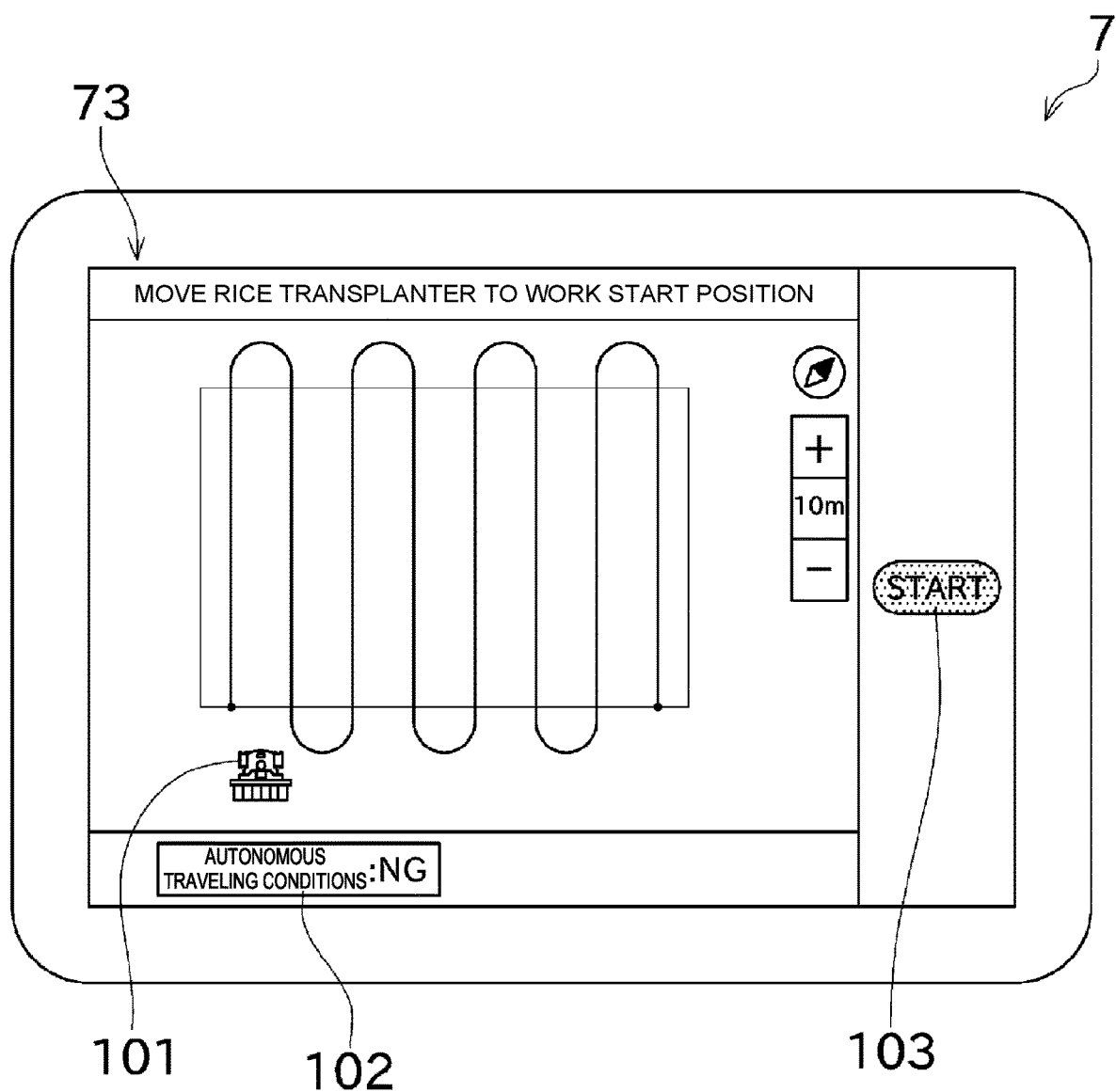
FIG. 7 is a diagram illustrating a wireless communication terminal on which a screen related to a preparation of autonomous traveling is displayed.

Next, with reference to FIGS. 6 to 8, a flow of performing the initialization processing after the power source of the rice transplanter 1 has been turned on and before starting the autonomous traveling will be described. As a specific situation, a situation where a positioning failure or the like has occurred during a preparation of autonomous traveling, and it is not possible to execute the autonomous traveling of the rice transplanter 1 unless the initialization processing of the inertial measurement unit 62 is performed again is assumed.

The initialization control portion 53 determines whether the initialization processing has already been completed or not (S201). When the initialization processing has already been completed, since the initialization processing does not need to be performed, processing related to autonomous traveling (S206) is performed.

If the initialization control portion 53 has not already completed the initialization processing, the initialization control portion 53 determines whether the GNSS-RTK positioning is enabled or not (S202), as in step S102. If the initialization control portion 53 determines that the GNSS-RTK positioning is enabled, the initialization control portion 53 conveys this fact to the wireless communication terminal 7. As a result, the display control portion 81 enables an initialization processing start button (S203).

The initialization processing start button is a button for the operator to instruct that the initialization processing should be started. In the present embodiment, the initialization processing start button is a button on a GUI displayed on the display portion 73 of the wireless communication terminal 7. A display of the start button for the initialization processing will be specifically described below with reference to FIGS. 7 and 8. FIG. 7 shows a screen to be displayed on the display portion 73 of the wireless communication terminal 7 during a preparation of autonomous traveling. On this screen, a work vehicle icon 101 indicating the position of the rice transplanter 1 is displayed on a map showing the farm field in which the autonomous traveling is to be performed. In addition, on this screen, a determination result button 102 indicating a result of determination of autonomous traveling conditions, and an autonomous traveling start button 103 for starting the autonomous traveling are displayed.

The determination result button 102 displays whether the autonomous traveling conditions are satisfied or not. In an example shown in FIG. 7, "NG" is displayed because the autonomous traveling conditions are not satisfied. The autonomous traveling start button 103 is a button for instructing that the autonomous traveling should be started. In the example shown in FIG. 7, since the autonomous traveling conditions are not satisfied, the autonomous traveling start button 103 is disabled (grayed out). As the determination result button 102 is operated, a screen shown in FIG. 8 is displayed.

Figure 8:
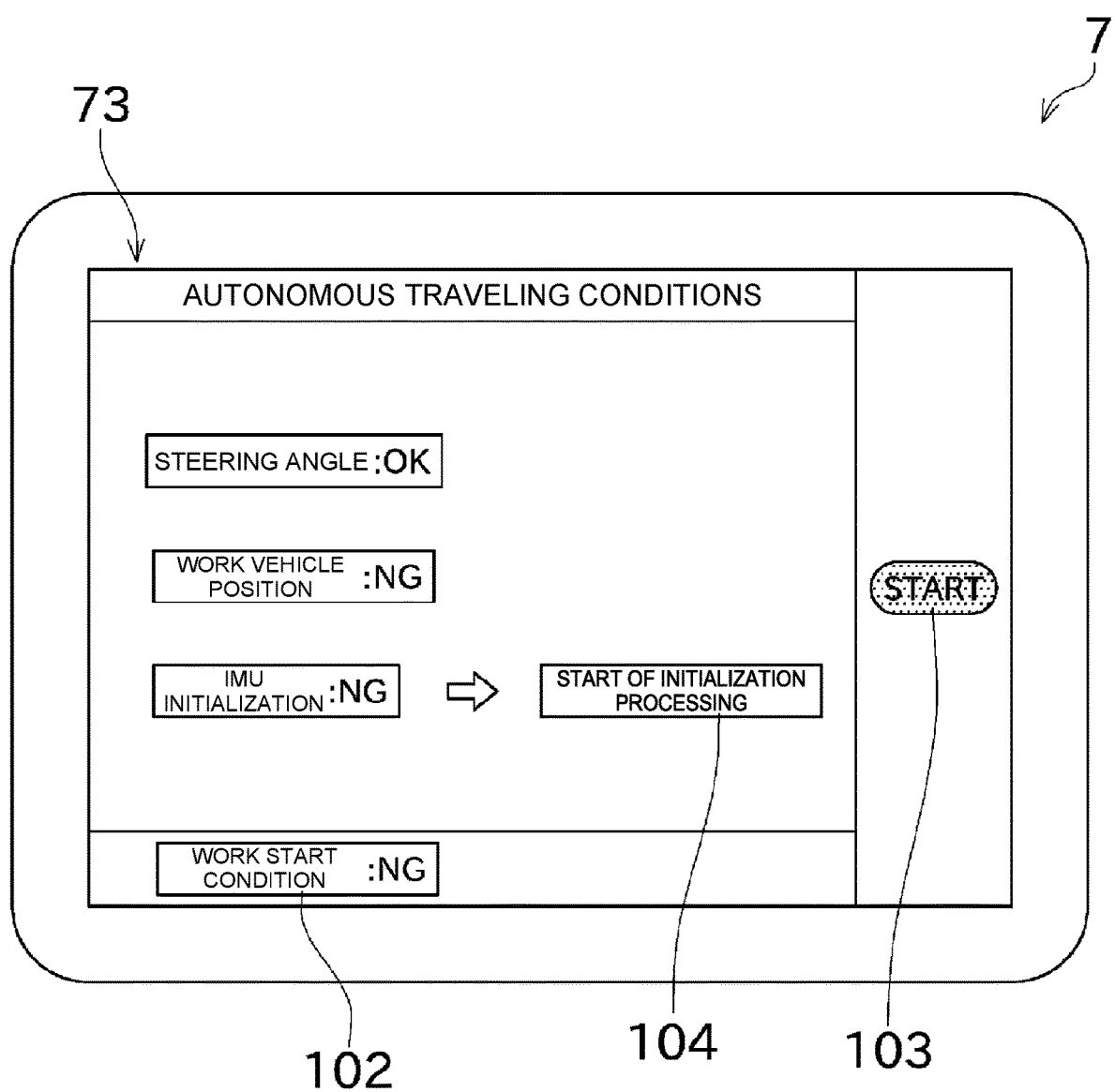
FIG. 8 is a diagram illustrating the wireless communication terminal on which a screen related to autonomous traveling conditions is displayed.

On the screen of FIG. 8, the details are indicated for the autonomous traveling conditions. In the present embodiment, the autonomous traveling conditions include that the steering angle is neutral, a work vehicle position matches with a start position of the travel route, and the initialization processing for the inertial measurement unit 62 (IMU) has been completed. Also, if the initialization processing has not been completed, an initialization processing start button 104 is displayed nearby. Note that a display position, a display hierarchy, etc., of the initialization processing start button 104 are shown as an example, and the initialization processing start button 104 may be displayed on the screen shown in FIG. 7, for example.

In the present embodiment, the initialization processing start button 104 is normally not displayed, and is displayed when this button is enabled in step S203. Alternatively, the initialization processing start button 104 may be configured such that the initialization processing start button 104 is normally displayed to be grayed out, for example, and is made operable when enabled in step S203. Also, in the present embodiment, while the initialization processing start button 104 is the button on the GUI, it may be a hardware key of the wireless communication terminal 7. Further, the initialization processing start button 104 may be provided not on the wireless communication terminal 7, but on another terminal that the operator possesses, or provided on the rice transplanter 1.

As the initialization processing start button 104 is operated, a signal instructing that the initialization processing should be started is transmitted from the arithmetic portion 80 (the initialization instruction control portion 82) to the control portion 50 (the initialization control portion 53). The initialization control portion 53 determines whether the initialization processing start button 104 has been operated or not on the basis of whether the above signal has been received (S204). When the initialization control portion 53 determines that the initialization processing start button 104 has been operated, the initialization processing is performed as in step S103 (S205).

As can be seen, in the present embodiment, since the initialization processing can be performed without setting the power source of the rice transplanter 1 to OFF, a time for restart is not required. Consequently, the initialization processing can be performed in a short time and with ease. In addition, if there is a setting that is deleted when the power source of the rice transplanter 1 is set to OFF, the time and effort required for making such setting can also be reduced.

For the autonomous travel system 100, initialization traveling may be performed manually or may be performed autonomously. However, by performing the initialization traveling autonomously, the time and effort of the operator can be reduced. In particular, in a case where the rice transplanter 1 is made to travel autonomously without human intervention (i.e., without having an operator onboard in the driver's seat 25), it is also possible to reduce the trouble of the operator to move to the rice transplanter 1 for the initialization traveling.

Moreover, when the initialization traveling is to be performed autonomously, the initialization traveling is started only when travel permission conditions are satisfied. The travel permission conditions are, for example, (1) there being no obstacle in an area to be passed through by the initialization traveling; (2) a start of the initialization traveling having been informed by a warning sound or the like; and (3) an operator, when he/she is to get on board in the driver's seat 25, being seated in the driver's seat 25. Condition (3) can be detected by, for example, a seat switch provided on the driver's seat 25 or on the lower side of the driver's seat 25. The above travel permission conditions are applied not only to the initialization traveling that is performed in a state where the power source of the rice transplanter 1 is ON, but also to the initialization traveling that is performed when the power source of the rice transplanter 1 is switched from OFF to ON.

It should be noted, as a matter of course, that the initialization processing must be performed in a state where the power source of the rice transplanter 1 (the control portion 50) is ON. In this respect, in the present embodiment, the rice transplanter 1 and the wireless communication terminal 7 can communicate with each other only when the power source of the rice transplanter 1 is ON. In other words, even if the initialization processing start button 104 is operated when the power source of the rice transplanter 1 is OFF, the initialization processing will not be performed. If the initialization processing start button 104 is to be provided on the side of the rice transplanter 1, the initialization processing start button 104 may be enabled only when the power source of the rice transplanter 1 is ON.

As a result of execution of the initialization processing, an IMU initialization condition among the autonomous traveling conditions is satisfied. If the other autonomous traveling conditions are satisfied, the autonomous traveling start button 103 becomes enabled (i.e., a grayout is cancelled). Further, when it is detected that the autonomous traveling start button 103 has been operated, the travel control portion 51 starts the autonomous traveling (S206).

As seen from the above, the condition setting portion 54 sets that an instruction to perform the initialization processing is received (i.e., a signal is received) when the power source of the rice transplanter 1 is ON, as a second starting condition for the initialization processing. Further, in the present embodiment, as another condition for starting the initialization processing, the GNSS-RTK positioning being enabled is also set.

Figure 9:
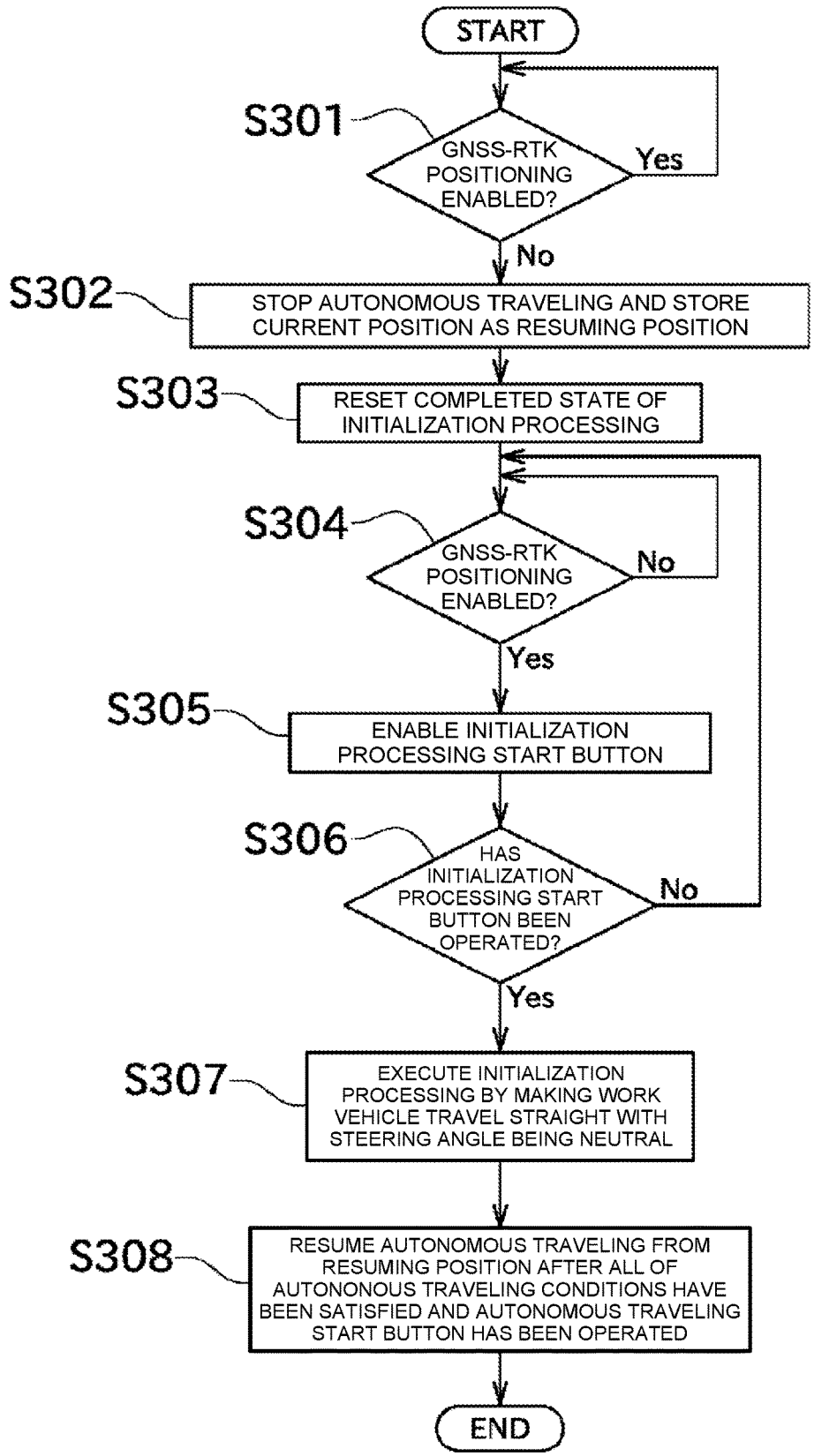
FIG. 9 is a flowchart illustrating processing for executing initialization processing during autonomous traveling.

Next, with reference to FIGS. 9 to 11, a flow of initialization processing, which is to be performed when execution of the initialization processing becomes necessary due to a positioning failure or the like occurred during execution of the autonomous traveling, will be explained.

Figure 10:
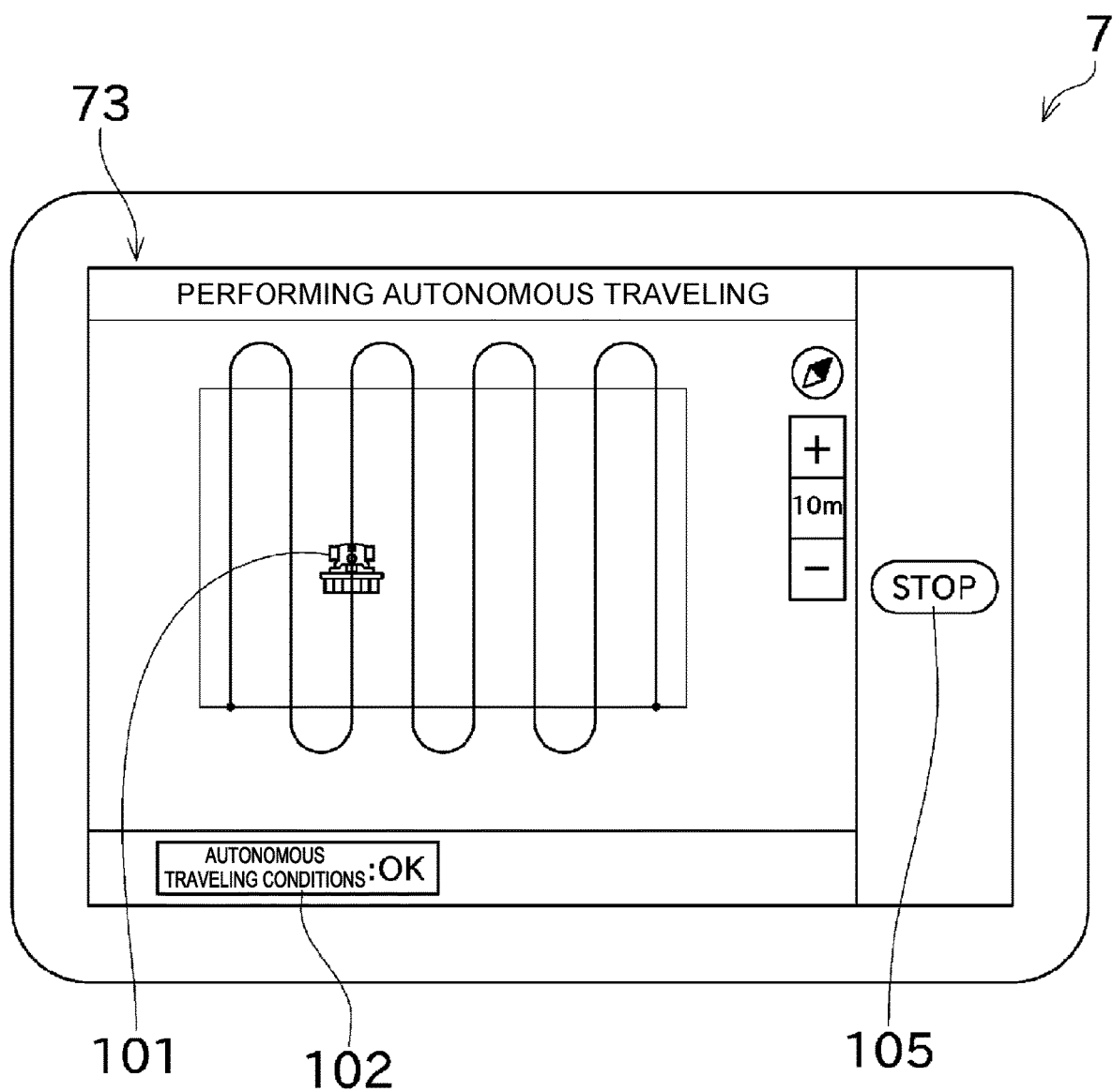
FIG. 10 is a diagram illustrating the wireless communication terminal on which a screen of the time when autonomous traveling is being performed is displayed.
Figure 11:
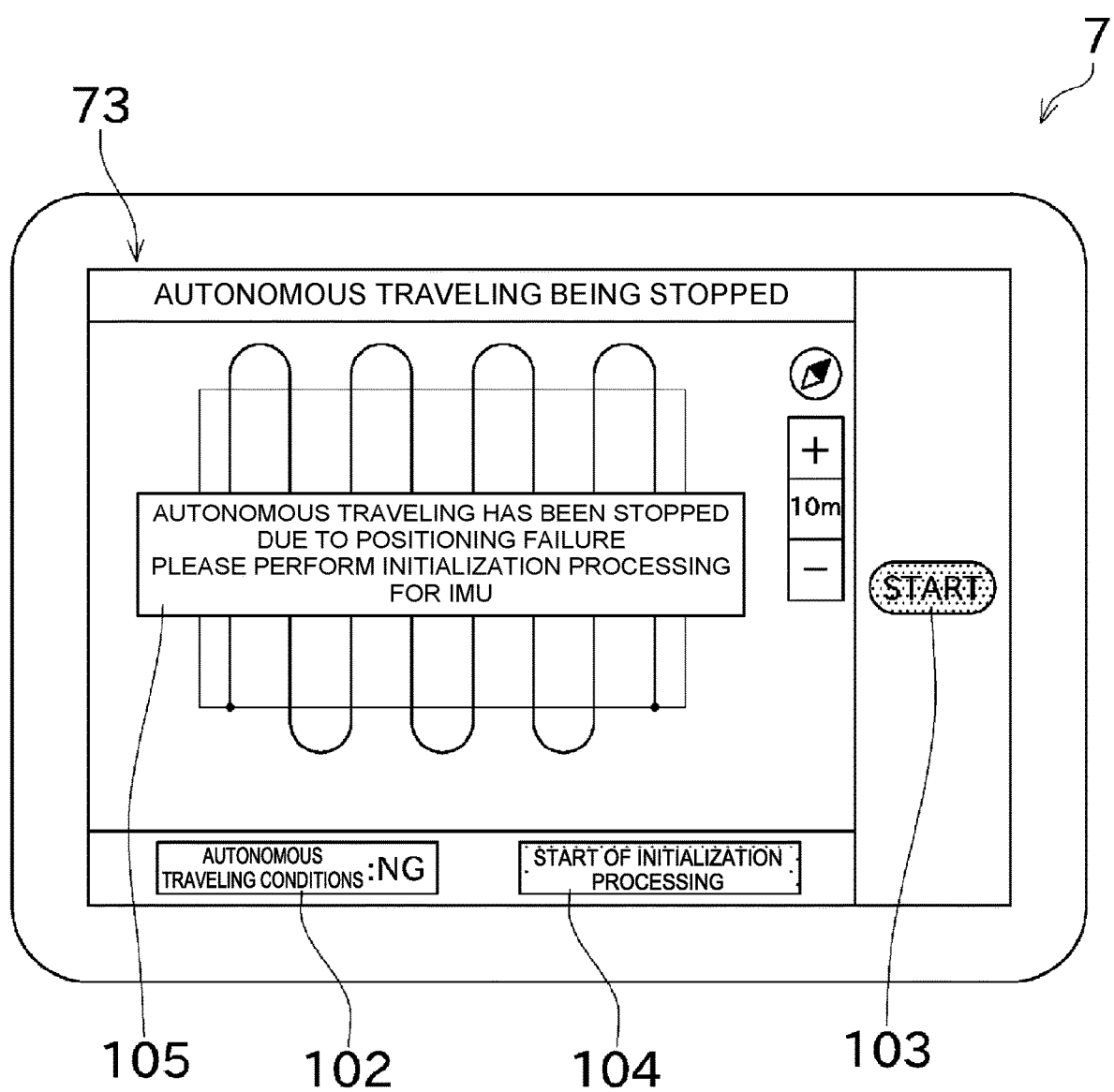
FIG. 11 is a diagram illustrating the wireless communication terminal on which a screen indicating occurrence of a GNSS positioning failure during execution of autonomous traveling is displayed.

FIG. 10 shows a screen to be displayed on the display portion 73 while the autonomous traveling is being performed. When the autonomous traveling is being performed, the position of the rice transplanter 1 and the travel route in the farm field are indicated. Further, an autonomous traveling stop button 105 is displayed instead at a place where the autonomous traveling start button 103 has been displayed. As the autonomous traveling stop button 105 is operated, autonomous traveling is stopped.

The control portion 50 detects whether the GNSS-RTK positioning is enabled or not (S301). In the following description, a state in which the GNSS-RTK positioning is not enabled will be simply referred to as "positioning failure", etc. As described above, if a positioning failure occurs, the position of the rice transplanter 1 cannot be acquired with high accuracy.

When a positioning failure occurs, the travel control portion 51 stops the autonomous traveling, and stores a current position as a resuming position (S302). The resuming position is the position for resuming the autonomous traveling. More specifically, since the rice transplanter 1 moves as it performs the initialization traveling, an area in which no work is performed arises. In order to prevent the above, the autonomous travel system 100 is configured to resume the autonomous traveling after returning the rice transplanter 1 to the resuming position.

In a case where a positioning failure has occurred, the values (set values) obtained in the initialization processing performed previously become unnecessary. Accordingly, the initialization control portion 53 resets a completed state of the initialization processing (S303). By the above, the set values obtained in the initialization processing performed previously are deleted. Also, resumption of the autonomous traveling of the rice transplanter 1 along the travel route 91 is prohibited until new initialization processing is performed.

Also, a fact that the autonomous traveling has been stopped due to the positioning failure is also transmitted to the wireless communication terminal 7. After the display control portion 81 of the wireless communication terminal 7 has received the fact from the control portion 50 that the autonomous traveling has been stopped due to the positioning failure, the display control portion 81 displays a message to that effect on the display portion 73 (see FIG. 11). The message may include that initialization processing needs to be performed, as shown in FIG. 11. Further, the display control portion 81 displays the initialization processing start button 104 on the display portion 73. Further, the initialization processing start button 104 is not enabled until the positioning failure is resolved, as shown in FIG. 11.

After that, when it is determined that the positioning failure has been resolved (S304), the display control portion 81 enables the initialization processing start button 104 by, for example, canceling a grayout of the initialization processing start button 104 (S305). Also, when the initialization processing start button 104 is operated (S306), the initialization instruction control portion 82 transmits, to the control portion 50, a signal instructing that the initialization processing should be started. When the initialization control portion 53 determines that the signal has been received, the initialization control portion 53 performs the initialization processing for the inertial measurement unit 62 by performing the initialization traveling, as in step S205 (S307). The points concerning the travel permission conditions are also the same as in step S205.

After that, if all of the autonomous traveling conditions are satisfied, and the autonomous traveling start button 103 is operated, the travel control portion 51 causes the rice transplanter 1 to move to a resuming position autonomously, and starts autonomous traveling from the resuming position (S308).

Note that the second starting condition for the initialization processing is common in both times when preparing for autonomous traveling and when the autonomous traveling is being stopped.

As described above, the autonomous travel system 100 of the present embodiment is provided with the position acquisition portion 64, the inertial measurement unit 62, the travel control portion 51, the initialization control portion 53, and the condition setting portion 54. The position acquisition portion 64 acquires a position of the rice transplanter 1 by using the satellite positioning system. The inertial measurement unit 62 detects the orientation of the rice transplanter 1. The travel control portion 51 causes the rice transplanter 1 to travel autonomously along the travel route 91 set in advance. The initialization control portion 53 performs the initialization processing for the inertial measurement unit 62 by obtaining the orientation of the rice transplanter 1 on the basis of an acquisition value of the position acquisition portion 64 that is acquired during execution of the initialization traveling in which the rice transplanter 1 travels straight in a predetermined direction. In the condition setting portion 54, it is set, as the first starting condition for the initialization processing, that the power source of the rice transplanter 1 is switched from OFF to ON, and it is set, as the second starting condition for the initialization processing, that an instruction to perform the initialization processing is received when the power source of the rice transplanter 1 is ON.

By the above feature, it is possible to have the initialization processing performed not only when the power source of the rice transplanter 1 is turned on from off, but also when the power source of the rice transplanter 1 is maintained to be ON, by an instruction given separately. Accordingly, since it becomes possible to perform the initialization processing without performing the processing of setting the power source of the rice transplanter 1 to OFF, the initialization processing for the inertial measurement unit 62 can be performed easily.

Also, in the autonomous travel system 100 of the present embodiment, the travel control portion 51 causes the rice transplanter 1 to perform the initialization traveling autonomously in a case where the initialization processing has not been completed, the first starting condition or the second starting condition is satisfied, and the travel permission conditions are satisfied.

By the above feature, the rice transplanter 1 can be made to travel autonomously to perform the initialization processing. Consequently, as compared to a case where an operator causes the rice transplanter 1 to travel manually, the time and effort of the operator can be reduced.

In addition, in the autonomous travel system 100 of the present embodiment, the travel control portion 51 stops the autonomous traveling along the travel route in a case where the position acquisition portion 64 becomes unable to acquire the position of the rice transplanter 1 with predetermined accuracy. The initialization control portion 53 resets the initialization completed state when the position acquisition portion 64 becomes unable to acquire the position of the rice transplanter 1 with predetermined accuracy. The travel control portion 51 causes the rice transplanter 1 to perform the initialization traveling autonomously in a case where the position acquisition portion 64 is enabled to acquire the position of the rice transplanter 1 with predetermined accuracy, the first starting condition or the second starting condition is satisfied, and the travel permission conditions are satisfied.

By the above feature, even if satellite positioning or the like is unsuccessful, the rice transplanter 1 can be made to travel autonomously to perform the initialization processing. Therefore, the time and effort of the operator can be reduced.

Furthermore, in the autonomous travel system 100 of the present embodiment, the travel control portion 51 sets, as a resuming position, a position where the autonomous traveling is stopped as a result of the position acquisition portion 64 being unable to acquire the position of the rice transplanter 1 with predetermined accuracy, and causes the rice transplanter 1 to travel autonomously to the resuming position after completion of the initialization processing.

By the above feature, even after occurrence of a change in the position by the initialization traveling, work can be resumed from the resuming position before the initialization traveling is performed.

Also, in the autonomous travel system 100 of the present embodiment, the instruction to perform the initialization processing is transmitted from the wireless communication terminal 7 that is provided separately from the rice transplanter 1.

By this feature, the initialization processing can be executed remotely.

While a preferred embodiment of the present invention has been described above, the above-described configuration may be modified as described below, for example.

The flowcharts indicated in the above embodiment are one example, and a part of the processing may be omitted, the specifics of a part of the processing may be changed, or new processing may be added. For example, when the initialization traveling is to be performed autonomously, it is possible to add processing of displaying such information on the display portion 73. Also, it is possible to determine again whether the GNSS-RTK positioning is enabled or not after the initialization processing start button has been operated.

In the above embodiment, it is determined whether the travel permission conditions are satisfied after the initialization processing start button 104 has been operated. Instead of doing so, the initialization processing start button 104 may be enabled when the travel permission conditions are satisfied.

In the above embodiment, the completed state of the initialization processing conducted previously is automatically reset in the event of a positioning failure. However, a configuration in which the above completed state is reset upon receipt of an instruction from an operator may alternatively be employed. In this case, a button for instructing that the initialization processing conducted previously should be reset, and a button for instructing that new initialization processing should be started may be provided separately. Alternatively, a configuration in which the above two kinds of processing are performed by an operation of a single button may be employed.

DESCRIPTION OF REFERENCE NUMERALS

1 Rice transplanter (Work vehicle)
7 Wireless communication terminal
50 Control portion
51 Travel control portion
52 Work machine control portion
53 Initialization control portion
54 Condition setting portion
64 Position acquisition portion
62 Inertial measurement unit (Orientation detection portion)
80 Arithmetic portion
81 Display control portion
82 Initialization instruction control portion
100 Autonomous travel system

The invention claimed is:

1. An autonomous travel system comprising:
a position acquisition portion which acquires a position of a work vehicle by using a satellite positioning system;
an orientation detection portion which detects an orientation of the work vehicle;
a travel control portion which causes the work vehicle to travel autonomously along a travel route set in advance;
an initialization control portion which performs initialization processing for the orientation detection portion by obtaining the orientation of the work vehicle based on an acquisition value of the position acquisition portion that is acquired during execution of initialization traveling in which the work vehicle travels straight in a predetermined direction;
a condition setting portion in which it is set, as a first starting condition for the initialization processing, that a power source of the work vehicle is switched from OFF to ON, and it is set, as a second starting condition for the initialization processing, that an instruction to perform the initialization processing is received when the power source of the work vehicle is ON;
wherein the travel control portion;
stops the autonomous traveling along the travel route when the position acquisition portion is no longer able to acquire the position of the work vehicle with a predetermined level of accuracy,
sets a resumption position as the position where the autonomous traveling was stopped when the position acquisition portion was no longer able to acquire the position of the work vehicle with a predetermined level of accuracy, and
causes the work vehicle to autonomously travel to the resumption position after the initialization processing is completed.

2. The autonomous travel system according to claim 1, wherein the travel control portion causes the work vehicle to perform the initialization traveling autonomously when the initialization processing is yet to be completed, the first starting condition or the second starting condition is satisfied, and travel permission conditions are satisfied.

3. The autonomous travel system according to claim 1, wherein:
the initialization control portion resets an initialization completed state when the position acquisition portion becomes unable to acquire the position of the work vehicle with predetermined accuracy; and
the travel control portion causes the work vehicle to perform the initialization traveling autonomously when the position acquisition portion is enabled to acquire the position of the work vehicle with predetermined accuracy, the first starting condition or the second starting condition is satisfied, and travel permission conditions are satisfied.

4. The autonomous travel system according to claim 1, wherein an instruction to perform the initialization processing is transmitted from a wireless communication terminal that is provided separately from the work vehicle.

* * * * *